Figure 1:
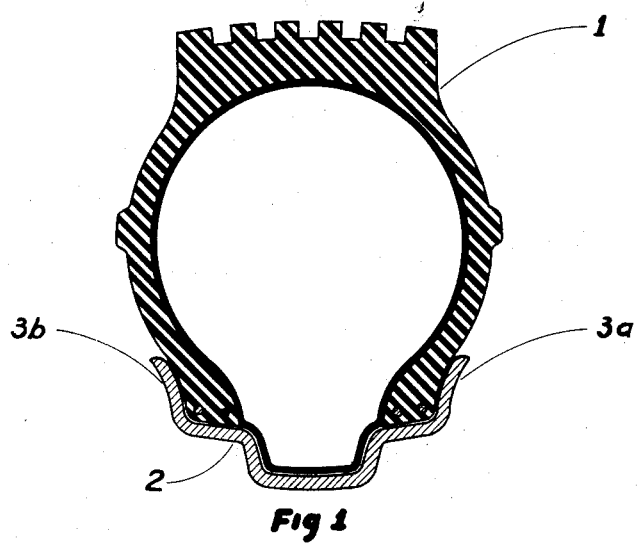
Figure 2:
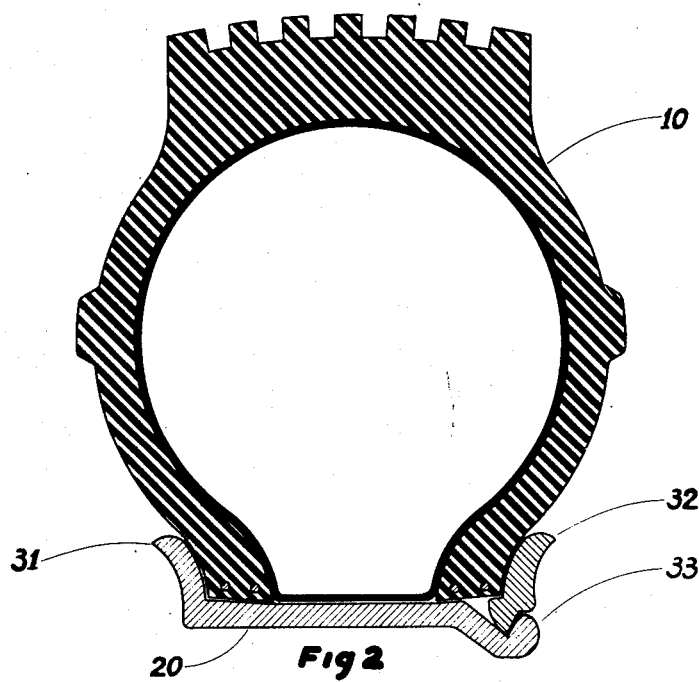

Jan. 4, 1955  J. F. McGROGAN  2,698,834
LUBRICANT FOR PROTECTION AND PRESERVATION
OF AUTOMOTIVE TIRES AND WHEELS
Filed Oct. 8, 1952

ATTEST:
Fred Philpitt

INVENTOR.
JOHN F. McGROGAN
BY Norbert E. Birch

ATTORNEY 2,698,834

LUBRICANT FOR PROTECTION AND PRESERVATION OF AUTOMOTIVE TIRES AND WHEELS

John F. McGrogan, Medford Lakes, N. J., assignor to The Atlantic Refining Company, Philadelphia, Pa., a corporation of Pennsylvania Application October 8, 1952, Serial No. 313,655

1 Claim. (Cl. 252—33.2)

This invention relates to a compound for the protection and preservation of vehicular tires and wheels. More particularly, this invention relates to a compound which will facilitate the installation and removal of tires from wheels and in addition will insure that the tire will not be accidentally disengaged from the wheel.

Nearly every motorist has at one time or another been faced with the unpleasant task of either replacing a tire which has been worn out by prolonged use, or of replacing a defective inner tube. Replacement of a worn out tire or inner tube simply involves removing the rubber tire from the metallic tire rim. The type of tire rim found on the majority of automobiles is shown in Figure I. Figure I is an end sectional view of a rubber tire 1 mounted on a tire rim 2. During actual operation of the automobile the inflated rubber tire is prevented from slipping off the tire rim by tire rim lips 3a and 3b, since lips 3a and 3b make the outer circumference of the tire rim slightly larger than the inner circumference of the rubber tire. When the tire becomes sufficiently worn so that replacement is desirable, the inner tube is deflated and by a slight stretching of the inner circumference of the rubber tire and gentle manipulation with a hammer or tire iron, the tire can be slipped over the tire rim lips 3a and 3b.

As a general rule, therefore, tire removal and replacement on ordinary pleasure automobiles is a comparatively simple operation requiring a minimum amount of time and physical exertion. This is so primarily because the rubber tires on most automobiles weigh less than 50 pounds and are only about 26 to 30 inches in diameter.

However, the problem of replacing tires and inner tubes on large commercial automotive vehicles, such as trucks and buses, is enormously more complicated and difficult. The fact that truck and bus tires often weigh several hundred pounds and are as much as 4 feet in diameter requires an entirely different method of mounting and demounting tires, since such large and heavy tires cannot be manually slipped over a tire rim whose outer circumference is larger than the inner circumference of the tire. A typical type of tire rim for trucks and buses using these large tires is shown in Figure II. The truck tire 10 is held upon the tire rim 20 by a radially extending flange 31 which is built into the tire rim 20, and by a lock rim 32 which fits into a lock rim retaining groove 33. The tire 10 is mounted upon the rim 20 by slipping the tire over the rim 20 until it engages the flange 31. The lock rim 32 is then slipped into the lock rim groove 33 and when locked therein by any suitable locking means, the tire is effectively held upon the tire rim.

Although the lock rim system of mounting truck and bus tires described in the foregoing paragraphs has been the most practical method yet developed, this system has a number of features which often render it highly hazardous to both the person operating the truck or bus and those who are assigned the task of changing the tires on these vehicles. These hazards reside in what is known as lock rim blow offs and occur when the lock rim is forced out of the lock rim groove by the lateral pressure exerted by the inflated rubber tire. In other words, the lock rim instead of being properly seated in the lock rim groove is often supported on fragments of rust present in the groove and as a consequence when subjected to the pressure exerted by the inflated tire and the many vibrations encountered during operation, the lock rim is inclined to fly off the wheel.

If this occurs during operation of the vehicle, it is very apt to cause a fatal road accident and at best the loss of a tire which usually costs between $100 and $1000. Even if the lockrim blowoff occurs when the truck or bus is not in operation, the consequences have often been fatal to those within the path of the lock rim which leaves the wheel with an almost explosive force. Workers who are constantly engaged in replacing tires on large truck fleets are well aware of the destructive capabilities of these lock rims, but despite the many precautions which are taken a number of lives are lost and numerous injuries inflicted each year.

A further problem which has been encountered in the changing of tires is known as frozen tires. In other words, after a tire has been mounted on a tire rim for a considerable length of time without having been removed for the repair or replacement of the inner tube, the tire itself often is found to be partially fused or bonded to the metallic portions of the tire rim. This condition is largely due to rust formation on the wheel, plus a tendency of the tire fabric to become brittle with heat, time, and use. This condition is more prevalent with truck tires due to the heavier loads which trucks carry and the greater pressures within the inflated tube. When such a condition is encountered, it is necessary to apply hammer and maul persuasion techniques to the tire to remove it from the rim. Such techniques often have a deleterious effect upon the tire by causing considerable damage to the tire side walls and partial or complete deterioration of the tire bead.

It is therefore an object of this invention to provide a means for minimizing or eliminating lock rim blowoffs by applying a compound adjacent the lock rim. It is a further object of this invention to minimize the tendency of rubber tires to partially fuse or bond themselves to metallic surfaces. It is an additional object of this invention to facilitate the mounting and demounting of tires upon tire rims and to preserve and protect these tires during use on the rim.

It has been discovered according to this invention that a tire and rim compound composed of a particular combination of ingredients will accomplish the foregoing objects. These ingredients are essentially as follows:

| | Weight per cent |
|---|---|
| High V. I. aromatic-free lube oil | 85 to 97.75 |
| Aluminum stearate | 2.0 to 14.75 |
| Sodium sulfonate | 0.25 to 5.0 |

The term "aromatic-free lube oil" as used herein and in the claim is meant to include high viscosity-low aromatic-low naphthenic-high paraffin mineral oils. A suitable procedure for determining whether any given mineral oil is acceptable for the present composition involves the use of the Rostler and Sternberg method of analysis. This method of analysis is fully described in the following publications: Industrial and Engineering Chemistry, 1949, volume 41, No. 5, page 598; Rubber Age, 1951, volume 67, No. 5, page 559; Rubber Age, 1952, volume 70, page 735. This method of analysis essentially comprises successively contacting a selected oil with (1) hexane, (2) 85% $H_2SO_4$, (3) 95% $H_2SO_4$, and (4) 120% $H_2SO_4$. That portion of the oil which is insoluble in hexane, (or precipitates therefrom) is deemed to be asphaltenes; that portion of the remaining oil which reacts with 85% $H_2SO_4$ is deemed to be N-base resins; that portion of the remaining oil which reacts with 95% $H_2SO_4$ is deemed to be Group I resins; that portion of the remaining oil which reacts with 120% $H_2SO_4$ is deemed to be Group II resins; and that portion of the original oil which is not reacted upon by any of the foregoing treatments is deemed to be composed of paraffinic hydrocarbons.

When subjected to the above outlined method of analysis, the oils which are suitable for the instant composition and which are meant to be included under the term "aromatic-free" oils, show the following results:

0–1% asphaltenes
0–3% N-base resins
0–3% Group I resins
65–100% paraffins
Remainder—Group II resins Mineral oils possessing the above described characteristics may be obtained from any desired source and in any desired manner. It has been found that solvent refined residual oils blended with distilled acid treated solvent oils form a particularly suitable mineral oil ingredient for the composition of the instant invention. The viscosity of the "aromatic-free" oil should be between 75 and 150 seconds at 210° F. (Saybolt), and preferably between 100 and 125 seconds at 210° F. (Saybolt), while the viscosity index of the oil should be at least 75 and preferably as high as possible.

The sodium sulfonate used in the present invention may be obtained from oil soluble petroleum sulfonic acids in a manner wellknown to the art. The production of mahogany sulfonic acids and salts thereof has been widely disclosed in the patent literature. It may be mentioned, however, that a conventional method for preparing these acids involves the treatment with concentrated sulfuric acid of a feed stock comprising a substantial portion of unsaturated cyclic hydrocarbons. Exemplary of the type of feed stocks may be used are the solvent extracts resulting from the solvent extraction of a distillate boiling in the lubricating oil boiling range, such as for example, a phenol extract. The extract layer, upon treatment with strong sulfuric acid, results in the formation of a first layer comprising oil and oil soluble sulfonic acids or mahogany acids, and a second layer comprising sludge particles and water soluble sulfonic acids. These two layers are then separated under the influence of gravity and the oil layer, including mahogany acids, is then extracted with a polar solvent such as water and isopropyl according to conventional methods to obtain the predominately oil soluble sulfonic acids. These oil soluble sulfonic acids may then be converted into the corresponding sodium salts by the addition of sodium hydroxide.

The ingredients which constitute the tire and rim composition of this invention may be compounded in any desired manner. It is desirable that the final composition possess a sufficient fluidity so that it may be easily and quickly applied to the tire and rim contact surfaces and yet possess enough plasticity that the composition will be maintained adjacent the contact surfaces under the variety of heat, pressure, and moisture conditions which the vehicle might encounter. The fluidity and plasticity of the compound may be adjusted to the desired degree by varying the proportions of the ingredients.

As an example of the present invention, one tire and rim composition was prepared having the following ingredients:

|  | Per cent by weight |
|---|---|
| High V. I., aromatic-free lube oil (115 Vis. at 210° F. SUS) | 92.5 |
| Aluminum stearate | 5.5 |
| Sodium sulfonate | 2.0 |

The composition recited above was prepared by charging a kettle with 400 pounds of aluminum stearate and 250 gallons of oil having the following Sternberg analysis:

| | |
|---|---|
| Asphaltenes | 0 |
| N-base resins | 2.4 |
| Group I resins | 0 |
| Group II resins | 31.3 |
| Saturated hydrocarbons | 66.3 |

These ingredients were mixed in the kettle while maintaining a temperature in the kettle of about 250–320° F. A smooth, transparent slurry was obtained after 4 to 5 hours, whereupon an additional 878 gallons of oil were added incrementally during a period covering several hours. The resulting mixture was then cooled to about 100° F. and mixed with 181 pounds of sodium sulfonate over a one hour period to produce the desired tire and rim composition.

This tire and rim composition of this invention has been extensively tested upon several commercial truck fleets. One truck fleet which applied this composition to the tires and tire rims of their trucks now has completed more than 10,000 tire changes without a single lock-rim blowoff. In addition, this truck fleet reports that the use of this composition materially reduced the number of man hours required in mounting and demounting tires, increased tire life, and increased wheel life. Another company operating a fleet of buses has reported that tires operated 40,000 to 70,000 miles using the compound showed no bead deterioration and greatly facilitated tire changing. Several companies servicing fleets of passenger cars, have also reported that the use of this composition greatly facilitates tire changing and practically eliminates the hammer and maul persuasion techniques which had previously been employed.

The tire and rim composition of this invention is expected to play an exceedingly important role as far as military vehicles are concerned. First of all, it is highly desirable to preserve and protect the tires of military vehicles during times of war, since the replacement of tires is practically impossible under many battle conditions. Secondly, and probably more important from the standpoint of military preparedness, it is necessary that the thousands of military vehicles which have been mothballed in warehouses and military depots be immediately available upon very short notice. Heretofore, this desired state of military preparedness has been greatly hampered by the fact that the rubber tires are often found to be fused or bonded to the tire rim after a prolonged period of storage. The prevalence of this condition has resulted in the loss of thousands of otherwise perfectly good tires and in addition has rendered the vehicle practically useless as a military asset until the frozen tires have been laboriously removed and replaced with new tires. It is clear, therefore, that the tire and rim compound of this invention will remove one of the weak links in our national defense.

That the tire and rim composition of this invention would be of such great value when applied to rubber tires was entirely unexpected. Even after preliminary laboratory tests had indicated that this composition possessed unexpected properties, a great deal of difficulty was encountered in convincing truck fleet owners to field test the composition. Their reluctance was based upon their previous observations that when a vulcanized rubber is contacted with a hydrocarbon oil the rubber will swell, lose tensile strength, and disintegrate. This undesirable condition is so wellknown that it has been reported in several rubber textbooks. However, the initial fears which the truck fleet operators voiced as to probable deleterious effects which would be encountered proved to be entirely without foundation and the only explanation which can be suggested for the unexpected compatability of the instant tire and rim compound is that the particular combination of ingredients employed in some manner or another alters or neutralizes certain undesirable characteristics originally possessed by the individual ingredients.

I claim:

A composition for facilitating the mounting and demounting of vehicular tires consisting essentially of 0.25% to 5.0% of sodium sulfonate, 2.0% to 14.75% of aluminum stearate, and 85% to 97.75% of an aromatic-free lube oil having a viscosity from 75 to 150 seconds Saybolt Universal at 210° F., a viscosity index in excess of 75, and a composition according to the Rostler and Sternberg method of analysis as follows:

- 0–1% asphaltenes
- 0–3% N-base resins
- 0–3% Group I resins
- 65–100% paraffins
- Remainder—Group II resins References Cited in the file of this patent

UNITED STATES PATENTS

| | | |
|---|---|---|
| 2,458,034 | Swenson | Jan. 4, 1949 |
| 2,479,432 | Tillotson | Aug. 16, 1949 |
| 2,491,441 | Butcosk | Dec. 13, 1949 |